Figure 1:
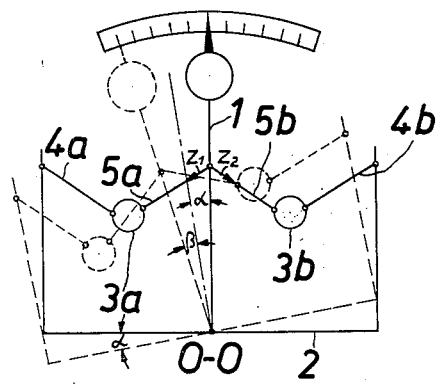

Dec. 26, 1961   O. HOFMANN   3,014,283
APPARATUS FOR DETERMINING SMALL INCLINATIONS OR THE
VERTICALITY OF A CASING BY MEANS OF A PENDULUM
Filed Oct. 8, 1956   2 Sheets-Sheet 1

Inventor
Otto Hofmann 3,014,283
**APPARATUS FOR DETERMINING SMALL INCLI-
NATIONS OR THE VERTICALITY OF A CASING
BY MEANS OF A PENDULUM**
Otto Hofmann, Jena, Germany, assignor to VEB
Carl Zeiss Jena, Jena, Germany
Filed Oct. 8, 1956, Ser. No. 614,763
2 Claims. (Cl. 33—215)

The invention relates to an apparatus for determining small inclinations or the verticality of a casing by means of a pendulum so attached to the casing that any change of the inclination of the casing causes the pendulum to swing into a new position of equilibrium.

In most known apparatuses of this kind the force of gravity is opposed by a spring or torsional force. A high degree of accuracy in determining inclination cannot however be obtained in this manner. Considerably better in respect of zero point constancy are two tape or thread cross-linked rollers, one of these being stationary and the other swingable, as have been used in the modified form of an articulated quadrilateral for the purpose of stabilising a line of sight.

According to the invention a new way is obtained for the most accurate determination of inclination, use being made of a weight or a plurality of weights joined by means of threads or tapes to the pendulum and its case, for the purpose of producing a position of equilibrium of the pendulum. Furthermore, the pendulum body may be constructed to be inverted or suspended for oscillation about one point or one axis or about two axes at right angles to one another. Common to all these arrangements is that the reactive moment of rotation on the pendulum due to the weights changes practically linearly according to pendulum rotation. Accordingly, there exists within small angles linear relation between the inclination of the pendulum to the case and the inclination of the case to the vertical.

In the case of a pendulum rotatable about a single fixed axis an advantageous form of construction of an apparatus according to the invention is obtained by providing two equal weights which lie on different sides of the axis of rotation of the pendulum and are suspended between the pendulum and the case.

It is advisable to provide the pendulum with a vibration damping means, for instance a dashpot.

The mounting of the pendulum in its case is advantageously effected either with the aid of a crossed-tape spring joint or by means of a stretched wire providing a torque.

The apparatus according to the invention is distinguished by high balancing accuracy, good zero point constancy, and easily controlled damping, and can be substituted for levels or pendulum apparatus in the determination of small angles of inclination relative to the vertical or horizontal. At the same time, the pendulum case must be rigidly connected to the appliance the inclination of which is to be determined or the vertical direction of which is to be established. In the simplest form the pendulum then serves as a pointer which moves in relation to a scale mounted on the pendulum case or on the appliance.

For more accurately levelling or determining the inclination, it is advantageous to provide suitable optical, mechanical or electrical means magnifying the deflection of the pendulum.

The apparatus according to the invention can be fixed in the housing of optical sighting mechanisms for observing near or distant objects for the purpose of automatic stabilisation of the line of sight, in which case for the purpose of deflecting the line of sight means must be provided, for example plane mirrors, which are rigidly joined some or one to the pendulum and some or one to the pendulum case in such manner that the deviations of the line of sight occurring on change of inclination of the sighting mechanism are cancelled. The apparatus may for example be mounted in front of the lens of an optical sighting mechanism. It may however also be so disposed for example that plane mirrors influence the converging rays of the sighting mechanism.

By means of a system of photoelectric cells allotted to a sighting mechanism, in conjunction with a readjusting device controlled by the photoelectric cells, the sighting mechanism can be returned into the horizontal position on change of its inclination to the horizontal position by means of an apparatus according to the invention.

An apparatus according to the invention is shown in various embodiments in the drawing.

Figure 2:
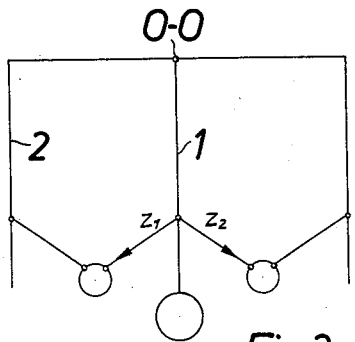
Figure 3:
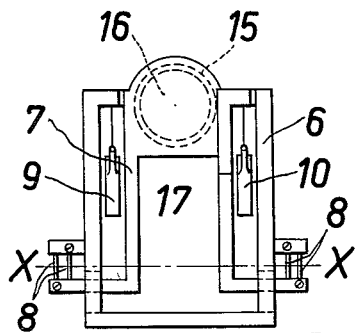
Figure 4:
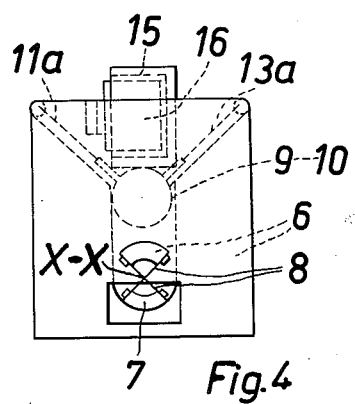
Figure 8:
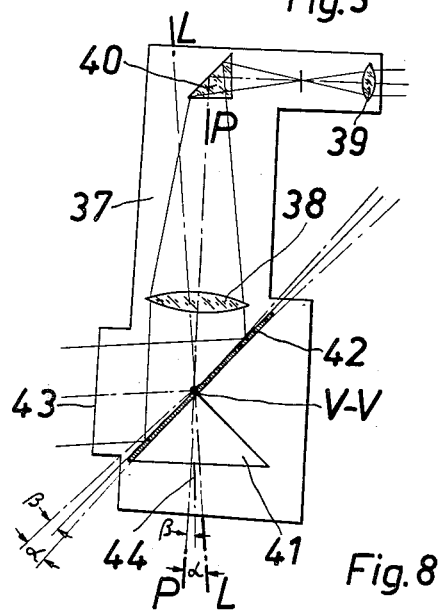
Figure 5:
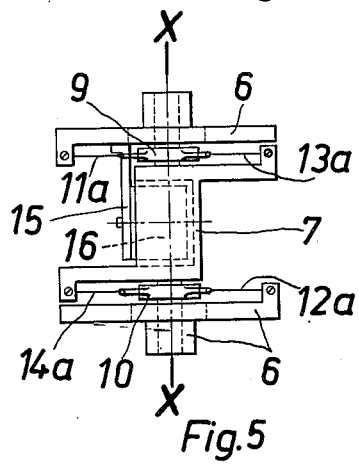
Figure 6:
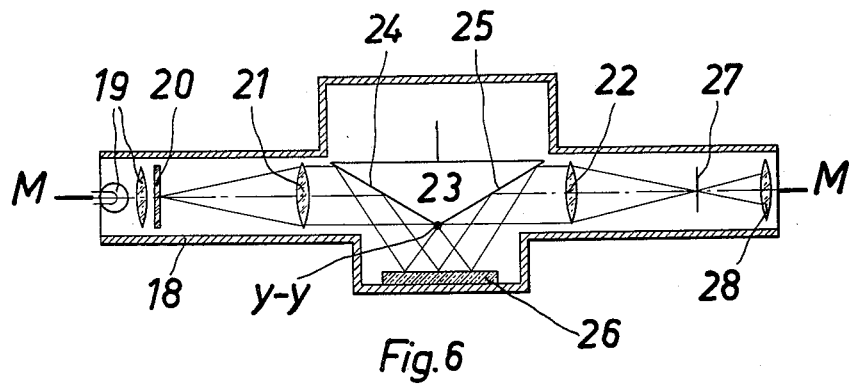
Figure 7:
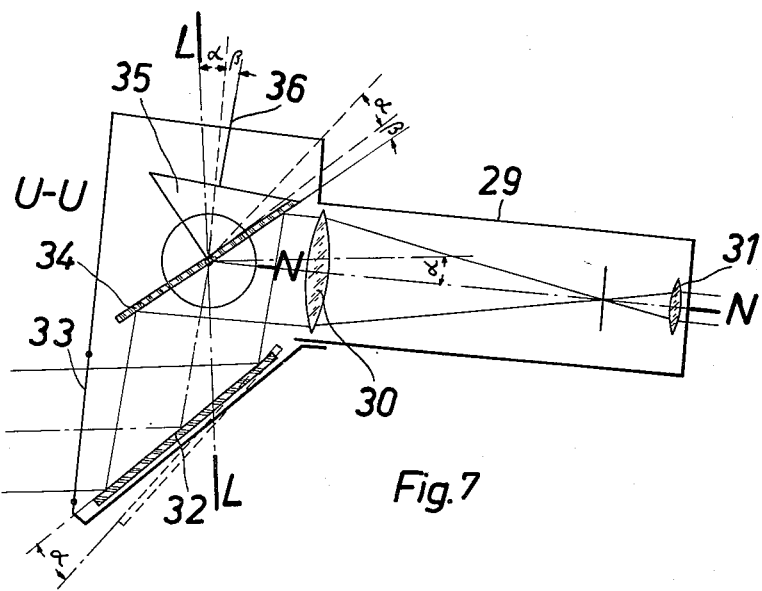
Figure 9:
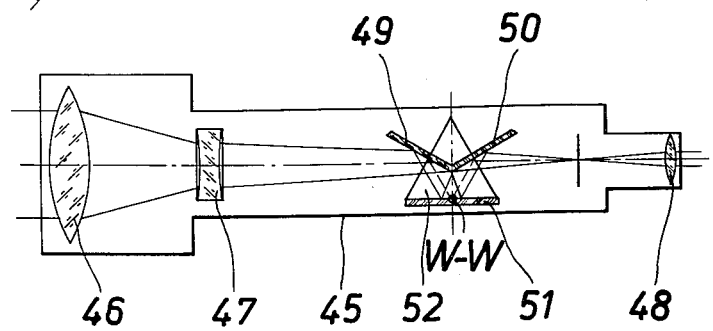

FIGURES 1 and 2 diagrammatically show two different arrangements of a pendulum, for the purpose of explaining the invention. FIGURES 3 to 5 show an inverted pendulum with a damping means in elevation, side elevation and in plan view respectively. FIGURE 6 shows an apparatus provided with a pendulum for the purpose of determining small inclinations to the horizontal. FIGURES 7, 8 and 9 show sighting mechanisms with automatic levelling of the line of sight. The sighting mechanism shown in FIGURE 7 is a levelling telescope in front of the lens of which is disposed an inverted pendulum with a plane mirror which is fastened thereon and to which the incoming light rays are reflected by a second mirror fastened on the telescope. FIGURE 8 shows a sighting mechanism in front of the lens of which is disposed a suspended pendulum provided with a mirror. FIGURE 9 shows a sighting telescope in which an inverted pendulum provided with a mirror is disposed behind the lens in the path of the converging rays, said mirror co-operating with two mirrors fastened on the telescope.

In FIGURE 1, 1 is an inverted pendulum provided with a case 2. The pendulum 1 and the case 2 are disposed to be rotatable about an axis O—O at right angles to the drawing plane. References $3a$ and $3b$ denote two equal weights each of which is suspended from the case 2 and the pendulum 1 by means of two thin wires $4a$, $5a$ and $4b$, $5b$ respectively. The weights $3a$ and $3b$ prevent the pendulum 1 from falling over. When the case 2 is inclined by an angle $\alpha$ about the axis O—O, as shown by broken lines, the pendulum 1 rotates in the same direction about the axis O—O by an angle $\alpha+\beta$ to a new position of equilibrium shown in broken lines, in which the difference between the tensions $Z_2-Z_1$ balances the moment of rotation of the pendulum. The angles $\alpha$ and $\beta$ being very small, they are exaggerated in the drawings. The ratio of $\beta$ to $\alpha$ is dependent upon the dimensioning of the individual elements of the pendulum and on the appertaining weights. The flexibility of the thin wires $4a$, $4b$, $5a$ and $5b$ is too weak to have any disturbing effect on the tensional forces due to the weights. To the pendulum 1 is fixed an index 53 cooperating with a scale 54 assumed to be fast with the case.

In FIGURE 2 the pendulum 1 is suspended. If the case 2 inclines, the pendulum tends to swing back into the vertical, but this is prevented by the equal weights. Equilibrium prevails when the restoring moment of the pendulum 1 balances the then constantly increasing difference $Z_2-Z_1$ between the tensions.

The apparatus shown in FIGURES 3 to 5 contains a case 6 and a pendulum body 7. By means of two crossed-tape spring-joints 8, the pendulum 7 is mounted in the case 6 for rotation about an axis X—X. References 9 and 10 denote two equal weights, which are suspended by means of two thin wires $11a$ and $12a$ respectively from the case and by means of two thin wires $13a$ and $14a$ respectively from the pendulum body 7. In the pendulum body 7 is fixed a cylinder 15 containing a piston 16 rigdly connected by an elbow 55 to the case 6. The axis of the cylinder 15 is at right angles to the plane of the drawing and coincides with that of the piston. The air between cylinder and piston dampens the pendulum oscillations. 17 is a place for suitable leveling or inclination indicating means, for example for optical elements for stabilising the line of sight. Instead of the crossed-tape spring-joints 8, a torsion wire can be used which supports the inverted pendulum and which is tautly connected to opposite sides in the case and contains the axis X—X.

In FIGURE 6, reference 18 is a housing in which cross-hairs 20 illuminated by an illuminating means 19 lie in the focal plane of a collimator lens 21. The rays are parallel between said lens 21 and a second collimator lens 22. Reference 23 denotes an inverted pendulum rotatable about an axis Y—Y at right angles to the drawing plane and provided with two equal weights as shown in FIGURE 1, and which has two reflecting surfaces 24 and 25, of which the surface 24 reflects to the lens 22 the parallel rays emerging from the lens 21, by means of a mirror 26 fastened on the housing 18 and via the reflecting surface 25. On change of inclination of the housing about an axis parallel to the axis of rotation Y—Y, the image of the cross-hairs 20 moves, under the action of the pendulum 23, in the focal plane 27 of the lens 22, out of the axis M—M. This shift can be observed through a magnifier 28 and be measured if desired.

In FIGURE 7, a levelling telescope contains a lens 30 and an eyepiece 31 in a housing 29. Reference 32 denotes a mirror which is fastened in the housing 29 in front of the lens 30 and which, when the optical axis N—N is in a horizontal position, has a position such that horizontal rays entering the housing 29 through a light admission aperture 33 enter the lens 30 parallel to the optical axis N—N after reflection from said mirror and a second mirror 34. The latter is fastened to an inverted pendulum 35, which is rotatable about an axis U—U at right-angles to the drawing plane provided with two equal weights as shown in FIGURE 1.

In the position illustrated, the housing 29 is so inclined in the clockwise direction about an axis parallel to the axis U—U that the optical axis N—N contains an angle $\alpha$ with the horizontal. At the same time the pendulum 35 with the mirror 34 assumes such a position that the pendulum axis 36 passes out of the vertical L—L into the position illustrated, in which it is inclined to the vertical by an angle $\alpha + \beta$, $\beta$ being equal to $$\frac{\alpha}{2}$$

In this position of the pendulum 35, the rays entering the housing 29 horizontally are so deflected, by means of the two mirrors 32 and 34, that they enter the lens 30 parallel to the optical axis N—N which is inclined to the horizontal by the angle $\alpha$.

In FIGURE 8, reference 37 is the housing of a telescope equipped with a lens 38, an eyepiece 39, and a prism 40, which deflects the axial rays through 90°. A suspended pendulum 41 is also mounted in the housing 37 in front of the lens 38 so as to be rotatable about an axis V—V at right angles to the drawing plane. The pendulum 41 is provided with two equal weights as shown in FIGURE 2. A mirror 42 is fastened on the pendulum and when the optical axis P—P of the lens 38 is vertical has such a position that horizontal rays entering the housing through a light admission aperture 43 are incident on the lens 38 parallel to its optical axis P—P after reflection from the mirror 42.

In the position illustrated the housing 37 is so inclined in the clockwise direction about an axis parallel to the axis V—V that the optical axis P—P forms an angle $\alpha$ with the vertical L—L. At the same time the pendulum 41 with the mirror 42 assumes a position such that the pendulum axis 44 passes out of the vertical L—L into the position illustrated, in which it is inclined to the vertical L—L by an angle $\alpha - \beta$, $\beta$ being equal to $$\frac{\alpha}{2}$$

In this position of the pendulum 41, the rays entering the housing 37 horizontally are so deflected by the mirror 42 that they enter the lens 38 parallel to the optical axis P—P, which is inclined to the vertical L—L by the angle $\alpha$.

In FIGURE 9, reference 45 is the housing of a sighting telescope, which is provided with a lens system containing a convergent lens 46 and a divergent lens 47, and an eyepiece 48. Between the lens system and the eyepiece two mirrors 49 and 50 inclined to one another are disposed rigidly in the path of the convergent rays. The rays of light entering through the lens system 46, 47 are reflected from the mirror 49 and pass to a mirror 51, which reflects them via the mirror 50 to the eyepiece 48. The mirror 51 is rigidly joined to an inverted pendulum 52, which is mounted to be rotatable about an axis W—W at right-angles to the drawing plane. The pendulum 52 is to be imagined as being provided with two equal weights as shown in FIGURE 1.

On change of inclination of the sighting telescope about an axis parallel to the axis W—W, the pendulum in conjunction with the mirror system 49, 51, 50 ensures that the axial ray emerging from the lens system 46, 47 always passes into a constant direction which, given appropriate adjustment, is horizontal.

I claim:

1. In an apparatus for determining small inclinations, a housing, a pendulum rotatably mounted on said housing, said pendulum assuming new positions of equilibrium when the inclination of said housing is being altered, a system of weights for producing said positions of equilibrium, said system of weights being suspended by threads fixed to said housing and said pendulum, said threads being kept taut by said system of weights, and a system for indicating changes in the inclination of said housing relative to the vertical, said indicating system being attached in part to said housing and in part to said pendulum.

2. In an apparatus for determining small inclinations, a housing, a pendulum rotatable about an axis on said housing, said pendulum assuming new positions of equilibrium when the inclination of said housing is altered in a plane at right angles to the axis of said pendulum, two equalized weights for producing said positions of equilibrium, said two weights being symmetrically suspended on either side of the axis of said pendulum by means of threads fixed to said housing and said pendulum, said threads being kept taut by said two weights, and a system for indicating changes in the inclination of said housing relative to the vertical, said indicating system being attached in part to said housing and in part to said pendulum.

References Cited in the file of this patent

UNITED STATES PATENTS

| | | |
|---|---|---|
| 1,154,396 | Hayot | Sept. 21, 1915 |
| 1,300,513 | Taylor | Apr. 15, 1919 |
| 2,336,804 | Redmon | Dec. 14, 1943 |
| 2,503,423 | Silverman et al. | Apr. 11, 1950 |
| 2,527,982 | Brock | Oct. 31, 1950 |
| 2,741,940 | Drodofsky | Apr. 17, 1956 |
| 2,779,231 | Drodofsky | Jan. 29, 1957 |

FOREIGN PATENTS

| | | |
|---|---|---|
| 533,445 | France | Dec. 9, 1921 |